Patented Dec. 4, 1928.

1,694,341

UNITED STATES PATENT OFFICE.

FRANK CROSSLEY, OF CLEVELAND, OHIO, ASSIGNOR TO JAMES E. PLANT, OF CLEVELAND, OHIO.

MAGNESIUM COMPOUND AND PROCESS OF PRODUCING THE SAME.

No Drawing. Application filed January 6, 1927. Serial No. 159,505.

This invention relates to the preparation of magnesium hydrate, and preferably a hydrate having an amorphous physical condition, and especially to the preparation of such hydrate from the ordinary milk of magnesium, for the purpose of obtaining therefrom a product capable of being formed into tablets and which, when so formed, will, when brought into contact with water or saliva, produce what is known as milk of magnesia.

In preparing magnesium hydrate in accordance with my invention, I employ pure prepared milk of magnesia, or prepare such pure milk of magnesia U. S. P. by any standard method of precipitating the hydrate from a magnesium salt by treating the latter with a hydrate, such as sodium or potassium hydrate. The milk of magnesia thus obtained is allowed to stand and settle, and, after as much as possible of the mother liquid has been run off, the remaining precipitate of magnesium hydrate is preferably filtered through a filter press to remove from the magnesium hydrate the larger portion of water or moisture, the effect of which is to leave a precipitated soft mass of magnesium hydrate. This soft mass of material is then subjected to heat, in any desired manner, preferably a temperature of not exceeding 250 degrees F. or such temperature as will remove all of the moisture in the mass (except its water of constitution) without affecting its physical, chemical or therapeutical properties.

The hydrate of magnesium thus obtained is now mixed with a binder, preferably comprising a mixture of cornstarch and sugar, preferably cane sugar, or other desirable diluents in the proportions of approximately two parts by weight of the cornstarch to one part by weight of sugar, the cornstarch serving to prevent the magnesium hydrate from becoming too hard when pressed into tablets so that the latter will readily disintegrate when brought into contact with water.

After the ingredients have been so admixed, the resultant mixture can be, and preferably is, granulated with alcohol to avoid carbonation of the resulting product, which would impair the physical and therapeutical qualities of the wafers or tablets into which it may be formed. Next the granulated mass is mixed with a suitable flavoring such as a mixture of oils of peppermint, anise, cassia, orange and nutmeg. The flavoring material is preferably mixed with the granulated mass by spraying it thereon by any suitable means.

Next, I press the material into tablets or wafers by any suitable mechanism adapted for effecting such operations.

To produce a tablet weighing approximately seven and one-half grains, I mix about 4.64 grains of the dried hydrate of magnesium with about three grains of the binder formed by the mixture of cornstarch and sugar, together with a very small quantity of the flavoring oils referred to hereinbefore. It has been found that a total of about one-thirty-second of a grain of such flavoring oils will be sufficient for one such tablet or wafer. While one or more of the flavoring oils or other flavoring ingredients may be employed, I have found that a mixture of the flavoring oils herein referred to produce a palatable wafer, and that best results are obtained by using all of these oils or ingredients.

The resultant tablet or wafer is stable and will not readily absorb carbon dioxide. Furthermore, it is pleasant to the taste and, when brought into contact with water or saliva readily forms therewith milk of magnesia which is smooth, bland and free from grittiness. A tablet containing moisture-free hydrate of magnesium in the proportions specified will, when brought into contact with water or saliva, yield about one teaspoonful of milk of magnesia, U. S. P. By making up the magnesia in the form of tablets or wafers, a dosage corresponding to one teaspoonful of pure standard milk of magnesia may be administered and retained under circumstances which would produce nausea were the milk of magnesia administered in its ordinary form.

It will be understood that in the use of the wafers made according to my process the same may be placed in the mouth and dissolved or one or more may be placed in a container in proportions of one tablet to each teaspoonful of water. When dissolved in either manner, milk of magnesia results. By producing magnesium hydrate in tablet form, accurate quantities or doses may readily be administered.

Having thus described my invention, what I claim is:—

1. The herein disclosed process which comprises drying precipitated hydrate of magnesium to remove therefrom substantially all moisture, adding to such dried hydrate cornstarch and sugar mixed in proportions to form a suitable binder, and granulating and flavoring the product thus formed.

2. The process of making hydrate of magnesium which consists in drying precipitated hydrate of magnesia, adding to such dried hydrate a binder consisting of cornstarch and sugar mixed in approximately the proportions of two parts of cornstarch to one part of sugar, adding flavoring oils to and granulating the product thus formed, and compressing the granulated product into tablets or wafers.

3. A wafer or tablet consisting of dried pure prepared precipitated hydrate of magnesia mixed with cornstarch and sugar in proportions to constitute a binder and having flavoring oils incorporated therewith and of a consistency to form a relatively smooth paste when subjected to water or saliva.

4. The compound for medicinal use consisting of pure hydrate of magnesium in dry light powder form intimately admixed with a sufficient quantity of a dry diluent capable of preventing agglomeration and carbonation.

In testimony whereof I have hereunto affixed my signature.

FRANK CROSSLEY.